(12) United States Patent
Hajimiri

(10) Patent No.: US 11,327,226 B2
(45) Date of Patent: May 10, 2022

(54) INTEGRATED PHOTONICS LONG-DISTANCE SENSING SYSTEM

(71) Applicant: California Institute of Technology, Pasadena, CA (US)

(72) Inventor: Seyed Ali Hajimiri, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 16/855,972

(22) Filed: Apr. 22, 2020

(65) Prior Publication Data

US 2020/0355869 A1 Nov. 12, 2020

Related U.S. Application Data

(60) Provisional application No. 62/836,984, filed on Apr. 22, 2019.

(51) Int. Cl.
*G02B 6/12* (2006.01)

(52) U.S. Cl.
CPC ..... *G02B 6/12019* (2013.01); *G02B 6/12004* (2013.01)

(58) Field of Classification Search
CPC .............................. G02F 2/004; G02B 6/12019
See application file for complete search history.

(56) References Cited

U.S. PATENT DOCUMENTS

| | | |
|---|---|---|
| 2,979,715 A | 4/1961 | Hammond |
| 4,321,604 A | 3/1982 | Ajioka |
| 5,097,353 A | 3/1992 | Fujiwara et al. |
| 2003/0072051 A1* | 4/2003 | Myers ............ H04J 14/002 398/43 |
| 2005/0202797 A1 | 9/2005 | Sorrells et al. |
| 2006/0251199 A1 | 11/2006 | Machesney |

(Continued)

FOREIGN PATENT DOCUMENTS

| | | | |
|---|---|---|---|
| CN | 102359830 B | * | 4/2013 |
| CN | 101715152 B | | 6/2013 |
| CN | 109682470 A | * | 4/2019 |

OTHER PUBLICATIONS

PCT/US2020/029399 International Search Report and Written Opinion dated Jul. 21, 2020.

*Primary Examiner* — Charlie Y Peng
(74) *Attorney, Agent, or Firm* — Ardeshir Tabibi; Weaver Austin Villeneuve & Sampson LLP

(57) ABSTRACT

A photonics sensing system includes, in part, first and second multipath integrated optical networks, an optical radiator, and an optical receiver. The first multipath integrated optical network includes, in part, N optical delay elements each supplying one of N delayed optical signals of a received optical pulse, N optical modules each supplying a portion of a different one of the N delayed optical signals, and an optical combiner adapted to combine the N delayed portions to generate a modulated optical signal. The smallest of the N delays is smaller than a width of the received optical pulse. The optical radiator is adapted to radiate the modulated optical signal. The optical receiver is adapted to receive a reflection of the transmitted signal. The second multipath integrated optical network is adapted to demodulate the reflected signal received by the optical receiver.

48 Claims, 14 Drawing Sheets

(56) References Cited

U.S. PATENT DOCUMENTS

2007/0159186 A1\* 7/2007 Grund .................... G01R 27/04
324/678
2017/0324162 A1 11/2017 Khachaturian et al.

\* cited by examiner

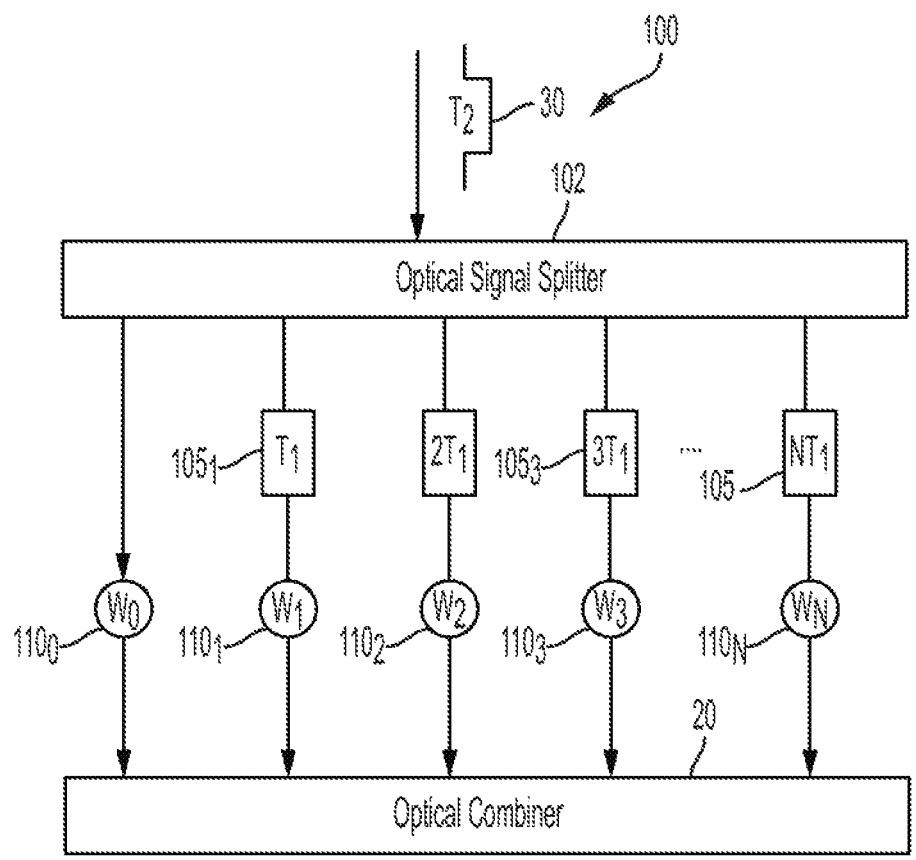
FIG. 3
  
FIG. 4A    FIG. 4B    FIG. 4C

INTEGRATED PHOTONICS LONG-DISTANCE SENSING SYSTEM

CROSS REFERENCE TO RELATED APPLICATIONS

The present application claims benefit under 35 USC 119 (e) of U.S. provisional Application No. 62/836,984, filed Apr. 22, 2019, entitled "Integrated Photonic Long-Distance Sensing System", the content of which is incorporated herein by reference in its entirety.

FIELD OF THE INVENTION

The present invention relates to remote sensing of objects using an optical signal.

BACKGROUND OF THE INVENTION

Integrated photonics platforms (such as silicon photonic platforms) facilitate the receipt, routing, manipulation, modulation, processing, and transmission of a relatively large number of optical signals, both coherently and non-coherently, in a compact, lightweight, highly-reproducible, and low-cost monolithic substrate by enabling the integration of relatively a large number of functional blocks on the substrate. Integrated photonics platforms are used in a variety of free-space applications, such as in steering optical beams using an optical phased array. They are also used in ranging applications by utilizing coherent optical pixels in a camera-like setting where an optical signal can be modulated with a linearly growing electrical signal (a chirp) to obtain information about the distance of the object.

BRIEF SUMMARY OF THE INVENTION

A photonics sensing system, in accordance with one embodiment of the present invention, includes, in part, first and second multipath integrated optical networks, an optical radiator, and an optical receiver. The first multipath integrated optical network includes, in part, N optical delay elements each supplying a different one of N delayed optical signals of a received optical pulse, N optical modules each supplying a portion of a different one of the N delayed optical signals; and an optical combiner adapted to combine the N delayed portions to generate a modulated optical signal. The delay supplied by the first optical delay element is shorter than a width of the received optical pulse. The optical radiator is configured to transmit (radiate) the modulated optical signal. The optical receiver is configured to receive a reflection of the transmitted signal. The second multipath integrated optical network is adapted to demodulate the reflected signal received by the optical receiver.

In one embodiment, the photonics sensing system further includes, in part, a down-converter adapted to down-convert a frequency of the demodulated signal to generate an electrical signal. In one embodiment, the photonics sensing system further includes, in part, a correlator adapted to correlate the down-converted electrical signal to a pseudo-random electrical signal so as to generate a correlation signal. In one embodiment, the down-converter includes a pair of photo-diodes.

In one embodiment, the pseudo-random electrical signal is applied to an electrical modulator to generate the optical pulse from an optical source. In one embodiment, the photonics sensing system further includes, in part, a processor adapted to determine a position of the object from the correlated signal.

In one embodiment, the N optical delay elements and the N optical modules are common to both the first and the second multipath integrated optical networks. In one embodiment, the photonics sensing system is integrated on a photonics substrate. In one embodiment, the N optical modules include, in part, N optical couplers. Each portion of a delayed signal is controlled by tapping a different part of an associated optical coupler.

In one embodiment, the N optical modules further include, in part, N directional couplers each associated with a different one of the N optical couplers. Each directional coupler is adapted to control an amplitude and/or a phase of the optical signal received from its associated optical coupler and deliver the amplitude and/or phase controlled optical signal to the optical combiner.

A multipath integrated optical network, in accordance with one embodiment of the present invention, includes, in part, N optical delay elements each supplying a different one of N delayed optical signals of a received optical pulse, N optical modules each receiving a portion of a different one of the N delayed optical signals to supply a weighted delayed signal, and an optical combiner adapted to combine the N weighted delayed signals to generate a modulated optical signal. The delay supplied by the first one of the N optical delay elements is shorter than a width of the received optical pulse.

In one embodiment, each of the N optical delay elements generates substantially the same amount of delay. In one embodiment, each of the N optical delay elements is generated by an equal length of the same waveguide. In one embodiment, each of a subset of the N optical modules supplies a phase inverted weighted delayed signal to the optical combiner. In one embodiment, the N optical modules include, in part, N optical couplers. In one embodiment, the N optical modules further include, in part, N optical directional couplers each associated with a different one of the N optical couplers.

In one embodiment, each of the N directional couplers is adapted to control an amplitude and/or phase of the optical signal received by the directional coupler. In one embodiment, the multipath integrated optical network is formed on a substrate.

A multipath integrated optical network, in accordance with one embodiment of the present invention, includes, in part, an optical signal splitter adapted to split an incoming optical pulse into at least N optical pulses (N being an integer greater than one), N optical delay elements each adapted to receive a different one of the N split optical signals and delay the received optical signal by a different amount of delay, an optical combiner adapted to combine different weights of the N delayed optical signals to generate a modulated optical signal. The weights are determined in accordance with a modulation scheme in conformity with which the optical signal is modulated.

In one embodiment, a delay by the $i^{th}$ delay element is i times the shortest delay. In one embodiment, of the N optical delay elements is a portion of a waveguide. In one embodiment, the multipath integrated optical network further includes, in part, N directional couplers receiving the N delayed optical signals and generating the N weighted delayed signals combined by the combiner.

A multipath integrated optical network, in accordance with one embodiment of the present invention, includes, in part, an optical waveguide. N optical couplers each adapted to receive a different fraction of an optical pulse propagating through the waveguide, N directional couplers each adapted to apply a different weight to a different one of the N optical signals supplied by the N optical couplers to generate a weighed optical signal, and an optical combiner adapted to combine the N weighted signals to generate a modulated optical signal. The delay associated with the first fraction of the optical signal propagating through the waveguide is shorter than a width of the optical pulse. In one embodiment, the N optical delay elements are portions of a waveguide.

A method of photonics sensing, in accordance with one embodiment of the present invention, includes, in part, generating N delayed signals of an optical pulse, applying N coefficients to the N delayed signals to generate N weighted delayed signals, combining the N weighted delayed signals to generate a modulated optical signal, radiating the modulated optical signal, receiving a reflection of the radiated signal, and demodulating the reflected signal. The smallest of the N delays is smaller than a width of the optical pulse.

In one embodiment, the method further includes, in part, down-converting the frequency of the demodulated signal to generate an electrical signal. In one embodiment, the method further includes, in part, correlating the down-converted electrical signal to a pseudo-random electrical signal so as to generate a correlation signal. In one embodiment, the method further includes, in part, down-converting the frequency of the demodulated signal using a pair of photodiodes.

In one embodiment, the method further includes, in part, applying the pseudo-random electrical signal to an electrical modulator to generate the optical pulse from an optical source. In one embodiment, the method further includes, in part, determining a position of an object causing the reflection from the correlation signal. In one embodiment, the method further includes, in part, demodulating the reflected signal via optical delay elements and optical modules used to generate the modulated optical signal.

In one embodiment, generating the N delayed signals, applying the N coefficients, combining the N weighted delayed signals, radiating the modulated optical signal, receiving a reflection of the radiated signal, and demodulating the reflected signal are performed using optical delay elements and modules formed in a photonic substrate. In one embodiment, the coefficients are applied by optical modules that include, in part, optical couplers different parts of which are tapped to generate the delayed signals. In one embodiment, the N optical modules further include, in part, N directional couplers each associated with a different one of the N optical couplers. Each directional coupler is adapted to control an amplitude and/or a phase of the optical signal received from the associated optical coupler and deliver the amplitude and/or phase controlled optical signal to an optical combiner combining the weighted delayed signals.

A method of modulating an optical pulse, in accordance with one embodiment of the present invention, includes, in part, generating a multitude of delayed signals of the optical pulse, applying a multitude of coefficients to the multitude of delayed signals to generate a multitude of weighted delayed signals, and combining the multitude of weighted delayed signals to generate the modulated optical signal. The smallest of the multitude of delays is smaller than the width of the optical pulse.

In one embodiment, the time period between each pair of successive delays is defined by the same delay value. In one embodiment, each of the delayed signals is generated by an equal length of the same waveguide. In one embodiment, the method further includes, in part, inverting a phase of each of a subset of the delayed signals.

In one embodiment, the multitude of coefficient are applied by a multitude of optical modules that include a plurality of optical couplers. In one embodiment, the multitude of optical modules further include a multitude of optical directional couplers each associated with a different one of the multitude of optical couplers. In one embodiment, each of the directional couplers is adapted to control an amplitude and/or phase of the optical signal received by that directional coupler. In one embodiment, the generation of the delayed signals, the application of the coefficients, and the combining of the weighted delayed signals are performed using optical delay elements and modules formed in a photonic substrate.

A method of modulating an optical pulse, in accordance with one embodiment of the present invention, includes, in part, splitting a received optical pulse into N split signals (N is an integer greater than one) delaying each of the N split signals by a different amount of delay to generate N different delayed signals, and combining the N weighted delayed signals to generate the modulated optical signal. The smallest of the N delays is smaller than a width of the optical pulse.

In one embodiment, the $i^{th}$ delay is i times the smallest delay, where i is an integer varying from 1 to N. In one embodiment, the optical pulse propagates through an optical waveguide different lengths of which generate the N delays. In one embodiment, the method further includes, in part, applying N weights to the delayed signals via N directional couplers to generate the N weighted delayed signals.

A method of modulating an optical pulse, in accordance with one embodiment of the present invention, includes, in part, receiving N different fractions of an optical pulse, applying different weights to the N different fractions of the optical signal to generate N weighed signals, and combining the N weighted signals to generate a modulated optical signal. The delay associated with a first fraction of the optical signal is shorter than a width of the optical pulse. In one embodiment, the N different fractions are received from a waveguide through which the optical pulse propagates.

BRIEF DESCRIPTION OF THE DRAWINGS

FIG. 3 is a simplified high-level block diagram of a multi-path integrated optical network, in accordance with one exemplary embodiment of the present invention.

FIGS. 4A, 4B and 4C show portions of a waveguide generating different delays.

DETAILED DESCRIPTION OF THE INVENTION

Figure 1:
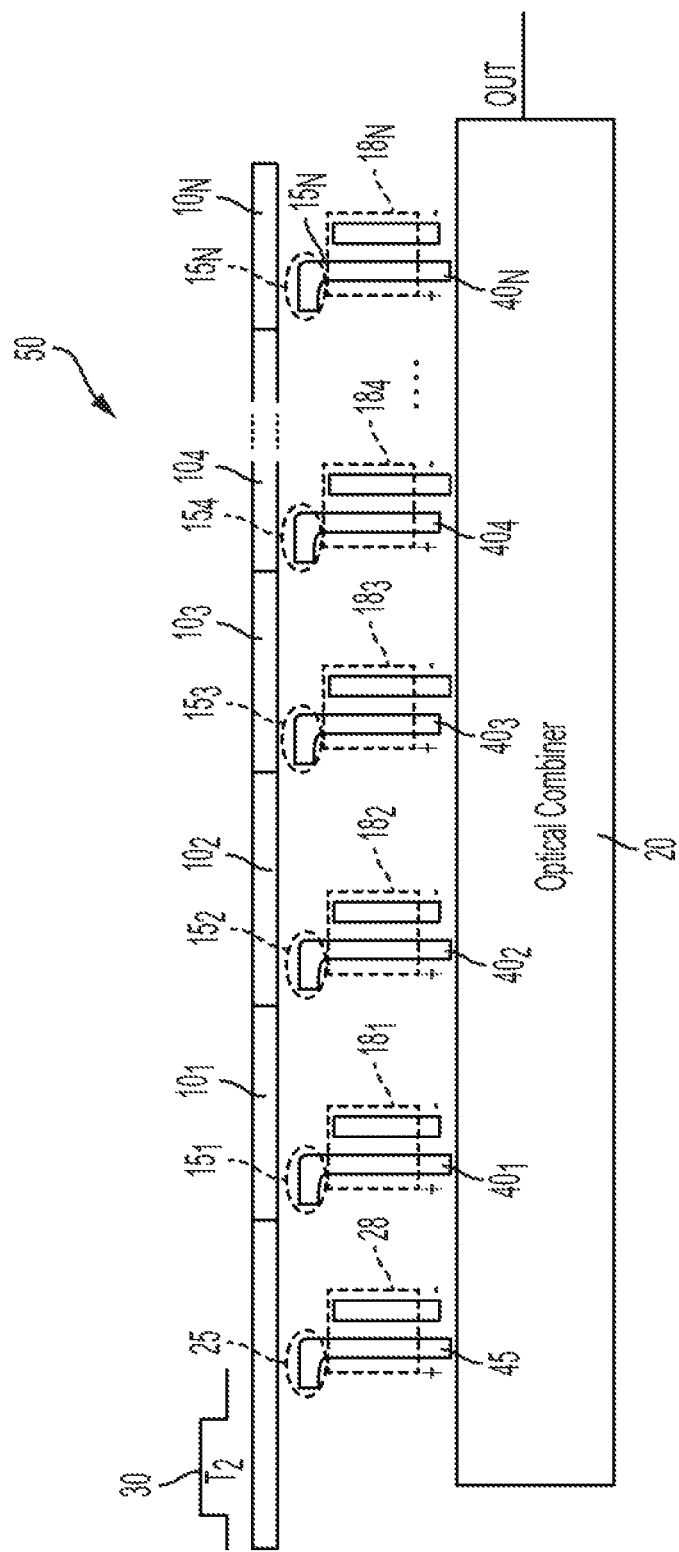
FIG. 1 is a simplified high-level block diagram of a multi-path integrated optical network, in accordance with one exemplary embodiment of the present invention.

In accordance with one embodiment of the present invention, an optical system that includes a multitude of optical components fully integrated on a substrate, such as a silicon substrate, accurately and efficiently provides distance measurements and sensing of remote objects. In one embodiment, a multi-path integrated optical network (alternatively referred to herein as MION) modulates a stream of optical pulses. The modulated optical pulse may be transmitted, either directly or indirectly, from one or more optical transmit elements forming an array and reflected off the object being sensed.

The signals reflected from object being sensed arrive at the MION (or a different MION, as described further below) with different delays. By resolving the time-of-flight of the signals, embodiments of the present invention accurately provide the distance of the object from the optical sensing system.

In accordance with one exemplary embodiment of the present invention, a MION includes a multitude of optical couplers and waveguides integrated on a photonic substrate, such as a silicon photonics substrate. An optical pulse delivered to the MION is modulated at the sub-pulse temporal scale (i.e. at a time scale that is shorter than the pulse width) by a predetermined pattern and with an enhanced correlation properties. Embodiments of the present invention are therefore adapted to perform modulations at time scales so short that even the fastest electro-optical modulators, such as Mach-Zehnder, ring-resonator, or electro-absorption modulators cannot attain. The pulse delivered to the MION may be generated by various means such as by using an electro-optical modulator.

The modulated signal may be represented as a sequence of weighted signals; such weights are represented by coefficients $c_n$ below:

$$C(t) = \sum_{n=0}^{N-1} c_n P_1(t - nT_1) = \sum_{n=0}^{N-1} C_n[u(t - NT_1) - u(t - (n+1)T_1)]$$

$$C(t) = c_0 u(t) - c_N u(t - NT_1) + \sum_{n=0}^{N-1} (c_{n+1} - c_n) u(t)$$

In the above expressions $P_1(t) = u(t) - u(t-T_1)$, where $T_1$ is the integrated delay time scale. In one embodiment, $T_1$ may be on the order of 100 fs. A pair of delayed $P_1$ pulses may also be represented in terms of $P_2$ pulses that are longer than $P_1$ pulses. For example, $T_2$ may be on the order of 10 ps. In other words, $$Q_1(t) = P_1(t) - P_1(t - T_2) = P_2(t) - P_2(t - T_1)$$

Using the delayed difference $D(t) = C(t) - C(t-T_2)$, it is seen that:

$$\begin{aligned} D(t) &= \sum_{n=0}^{N-1} c_n Q_1(t - nT_1) = \sum_{n=0}^{N-1} c_n P_1(t - nT_1) - \\ &\quad \sum_{n=0}^{N-1} c_n P_1(t - nT_1 - T_2) \\ &= \sum_{n=0}^{N-1} c_n P_2(t - nT_1) - \sum_{n=0}^{N-1} c_n P_2(t - (n+1)T_1) \\ &= c_0 P_2(t) - c_{N-1} P_2(t - NT_1) + \sum_{n=0}^{N-1} (c_{n+1} - c_n) P_2(t - nT_1) \end{aligned}$$

Therefore:

$$D(t) = c_0 P_2(t) - c_{N-1} P_2(t - NT_1) + \sum_{n=0}^{N-1} d_n P_2(t - nT_1)$$

where $d_n = c_{n+1} - c_n$ are coefficients that are based on the difference of the two adjacent values of $c_n$ that can have multiple discrete values. For example, if $c_n$ have binary values, namely $c_n \in \{+1,-1\}$ then $d_n \in \{+2, 0, -2\}$.

FIG. 1 is a simplified high-level block diagram of a MION 50, in accordance with one exemplary embodiment of the present invention. MION 50 is shown as including, in part, N optical delay elements $10_i$ where i is an index ranging from 1 to N, N optical couplers $15_i$, N directional couplers $18_i$ and an optical combiner 20. N is understood to be an integer greater than 1. Each optical delay element $10_i$, shown as being a segment of a waveguide, is shown as delaying the optical signal it receives by $T_1$ time period. Each optical coupler (also referred to herein as coupler) $15_i$ is adapted to receive a fraction (for example one-half) of the light (optical signal) propagating through the associated optical delay element to which the optical coupler is coupled. For example, optical coupler $15_1$ is shown as being coupled to and receive a fraction of the optical pulse propagating through delay element $10_1$. In some embodiments, the fraction of the light received by each optical coupler may be variable and programmable.

Each directional coupler $18_i$ is adapted to receive the optical signal from its associated optical coupler, apply a weight (weight coefficient) to the received signal, and deliver either the weighted signal or a 180° phase-shifted weighted signal to optical combiner 20. For example, directional coupler $18_1$ is shown as receiving the optical signal from its associated optical coupler $15_1$, applying a weight to the received signal, and delivering the weighted signal to combiner 20. Similarly, directional coupler $18_2$ is shown as receiving the optical signal from its associated optical coupler $15_2$, applying a weight to the received signal, and delivering the weighted signal to combiner 20.

Directional coupler $18_3$ is shown as receiving the optical signal from its associated optical coupler $15_3$, applying a weight and shifting the phase of the received signal by 180°, and delivering the phase-shifted weighted signal to combiner 20. In FIG. 1, the weighted optical signal supplied by a directional coupler to the optical combiner is identified with a "+" sign and is alternatively referred to as a true signal, and the phase-inverted weighted optical signal supplied by an optical coupler to the optical combiner is identified using a "−" sign, and is alternatively referred to herein as a complement signal. Therefore, each directional coupler $18_i$ supplies either the true optical signal or its complement to optical combiner 20 in conformity with a selected modulation scheme. Accordingly, each directional coupler is adapted to change both the phase and the amplitude of the optical signal it receives. For example, directional coupler $18_4$ is shown as delivering a true signal to optical combiner 20 and directional coupler $18_N$ is shown as delivering a complement signal to optical combiner 20. It is understood that coefficients $c_n$ of the above equations are set by the coupling coefficients of the optical couplers and/or directional couplers of MION 50. Although not shown for simplicity and clarity, It is understood that the amplitude and the phase of an optical signal propagating through any one of the directional couplers may be changed through a number of different components, such as a thermal modulator, electro-optical modulator, and the like.

MION 50 is also shown as including, in part, an optical coupler 25 that receives a fraction of the incoming optical pulse 30 delivered to MION 50. MION 50 is also shown as including, in part, a directional coupler 28 that receives the light coupled to optical coupler 25. Directional coupler 25 delivers to optical combiner 20 either the true or the complement of the optical signal it receives from optical coupler 25 in conformity with the selected modulation scheme.

MION 50 is thus adapted to deliver, in part, N different weighted (either true or complement) and delayed optical signals of the incoming optical pulse 30 to optical combiner 20. For example, optical signal $40_1$ is a weighted signal of pulse 30 delayed by $T_1$ time period. Optical signal $40_2$ is a weighted signal of pulse 30 delayed by $2T_1$ time period; optical signal $40_3$ is a phase-inverted weighted signal of pulse 30 delayed by $3T_1$ time period; and optical signal $40_N$ is a weighted signal of pulse 30 delayed by $NT_1$ time period. Optical combiner 20 also receives optical signal 45 which is a weighted signal of the optical pulse 30. It is understood that the shown phases of the delayed and weighted optical signals $40_i$ and 45 received by optical combiner 20 are only exemplary and may be different depending on the selected modulation scheme. In one embodiment, each optical coupler $15_i$ delivers 50% of the optical signal it receives from its associate optical delay element $10_i$.

Optical combiner 20 is adapted to combine optical signals $40_i$ and 45 to generate an optical signal OUT which is a modulated from of optical pulse 30. Because signal OUT is modulated using time period $T_1$, in accordance with embodiments of the present invention, which is smaller than the width $T_2$ of pulse 30, signal OUT benefits from finer time resolutions of $T_1$ and therefore provides an enhanced and a more accurate measure of the spacing of the object from the MION.

Figure 2:
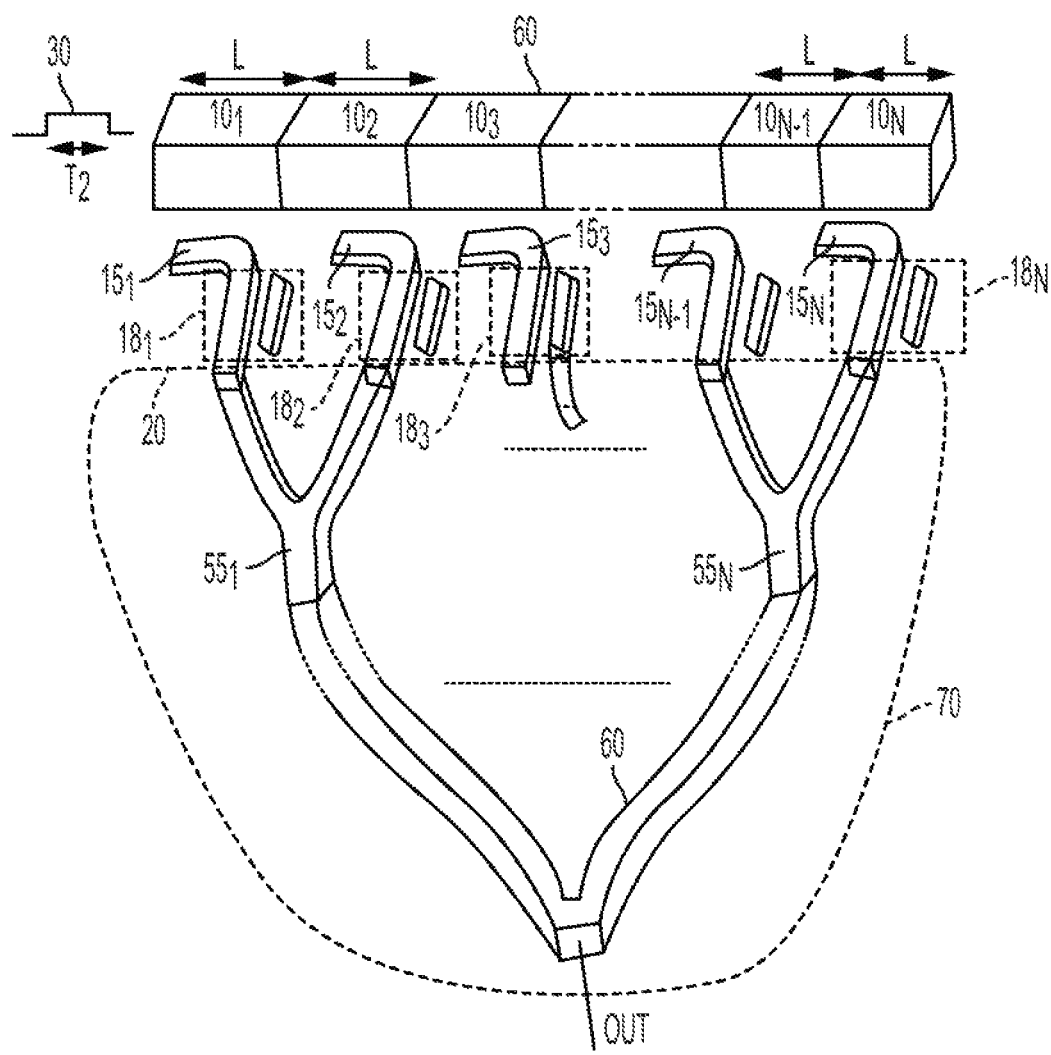
FIG. 2 is a simplified high-level block diagram of a multi-path integrated optical network, in accordance with one exemplary embodiment of the present invention.

FIG. 2 is a simplified schematic view of one exemplary embodiment of MION 50. The length of waveguide 60 through which pulse 30 propagates is shown as being divided into N segments $10_1 \ldots 10_N$ each of which has the same length L causing the same delay of $T_1$ in pulse 30. In other words, the delay caused by each segment $10_i$—defined by the length L of the segment—has the same value $T_1$. Each optical coupler $15_i$ together with its associated directional coupler is adapted to deliver a portion of either a true or a complement of weighted optical signal propagating through its associated wavelength segment $10_i$. Combiner 20 is shown as including multiple Y-junctions that, depending on the number of waveguide segments, may be arranged in several stages. For example, the optical signal travelling through directional couplers $18_1$ and $18_2$ are added together by Y-junction $55_1$, and the optical signal travelling through directional couplers $15_{N-1}$ and $15_N$ are added together by exemplary Y-junction $55_N$. The various Y-junctions are shown as being combined by final stage Y-junction 60 that may include additional stages not shown for clarity and simplicity. Signal OUT generated at the output of the combiner 20 may be optically transmitted using any number of optical radiators, such as a grating coupler, either to another optical medium or to free space.

FIG. 3 is a simplified high-level view of a MION 100, in accordance with another exemplary embodiment of the present invention. MION 100 is shown as including, in part, an optical splitter 102 adapted to split the received incoming optical signal 30 into N signals. MION 100 is also shown as including, in part, N optical delay elements $105_i$, where i is an integer varying from 1 to N. Each delay element $105_i$ delays the optical signal it receives by a different amount. In the exemplary embodiment shown in FIG. 3, delay element $105_1$ delays the optical signal it receives by $T_1$ time period, delay element $105_2$ delays the optical signal it receives by $2T_1$ time periods; and delay element $105_N$ delays the optical signal it receives by $NT_1$ time periods. Delay time period $T_1$ is shorter than the width $T_2$ of pulse 30 received by optical splitter.

MION 100 is also shown as including, in part, N optical modules $110_i$ each associated with and adapted to receive an optical signal from its associated delay element $105_i$, apply a weight to the received signal and deliver the weighted signal or the phase-inverted weighted signal to optical combiner 20. For example, optical modules $110_1$ applies a weight $w_1$ to the optical signal it receives from delay element $105_1$ and supplies the weighted signal (which may be a negatively weighted signal if the phase of the signal has been inverted) to optical combiner 20. Similarly, optical modules $110_N$ applies a weight $w_N$ to the optical signal it receives from delay element $105_N$ and supplies the weighted signal to optical combiner 2.

In one embodiment, each optical module $110_i$ includes an optical coupler and a directional coupler delivering a weighted fraction (or a weighted fraction of a phase—inverted signal) of the optical signal they receive from its associated delay element $105_i$. In one exemplary embodiment, each optical module $110_i$ delivers 50% of the optical it receives from its associated delay element $105_i$. Although not shown in FIG. 3, it is understood that each optical module $110_i$ delivers a portion of either the optical signal it receives (i.e., the true signal), or the phase-inverted replica (i.e., the complement) of the signal it receives in accordance with a selected modulation scheme. In such embodiments, each weights $w_i$ may be viewed as being either +1 or −1. MION 100 is also shown as including optical module $110_0$ adapted to deliver either a weighted fraction of the optical signal the module receive from splitter 102, or a phase-inverted weighted fraction of the optical signal the module receives from splitter 102. Optical combiner 20 may operate in the same manner as that shown in FIG. 2. FIGS. 4A, 4B and 4C show three waveguide portions formed to generate respectively $T_1$, $2T_1$ and $3T_1$ delays, in accordance with one example.

Figure 5:
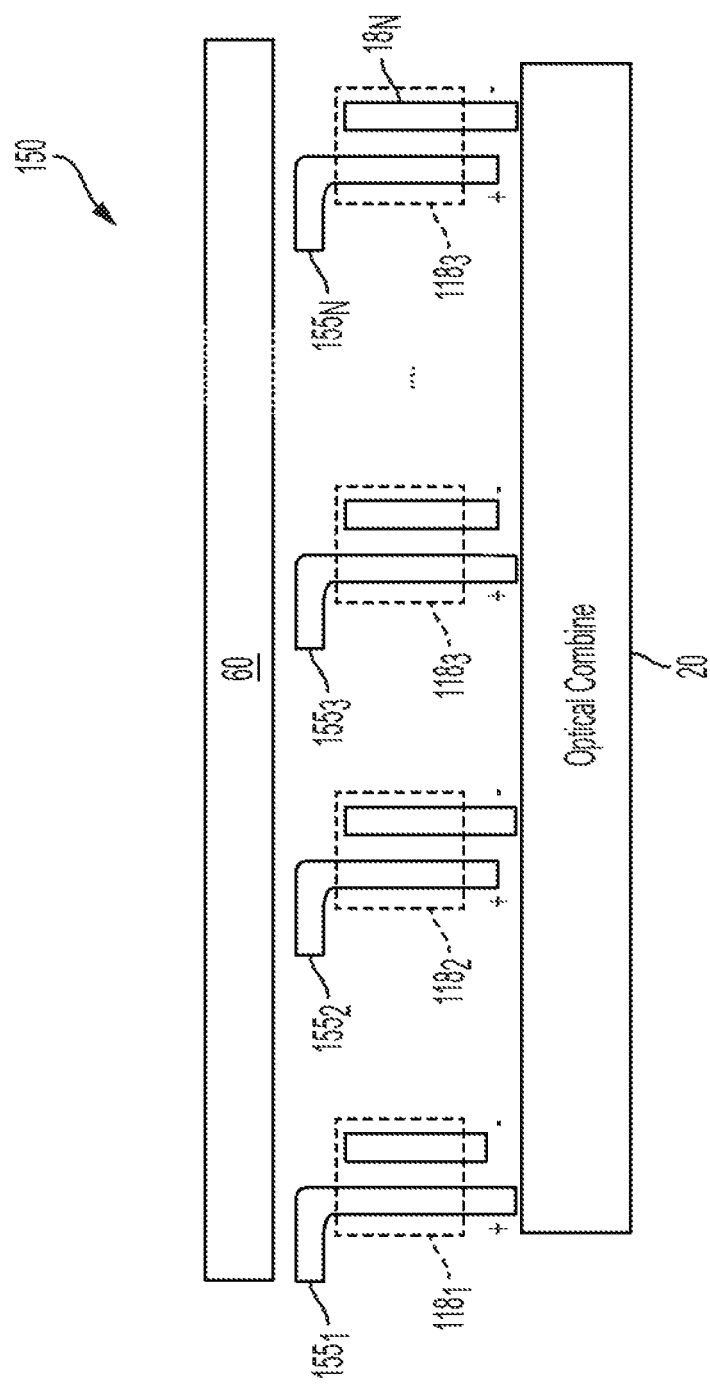
FIG. 5 is a simplified high-level block diagram of a multi-path integrated optical network, in accordance with one exemplary embodiment of the present invention.

FIG. 5 is a simplified high-level view of a MION 150, in accordance with another exemplary embodiment of the present invention. MION 150 is shown as including, in part, N optical couplers $155_i$ each receiving and supplying a different fraction of the optical signal propagating through optical waveguide 60. For example, optical coupler $155_1$ is shown as supplying $k_1$ fraction of the optical signal propagating through waveguide 60. Similarly, optical coupler $155_N$ is shown as supplying $k_N$ fraction of the optical signal propagating through waveguide 60. MION 150 is also shown as including, in part, N directional couplers $118_i$. Each directional coupler $118_i$ delivers either a weighted portion of the optical signal it receives from its associated optical coupler $155_i$ (i.e., the true signal), or the phase-inverted weighted portion of the optical signal it receives from its associated optical coupler 155 (i.e., the complement signal), For example, directional couplers $118_1$ and $118_3$ are shown as delivering true weighted signals, and directional couplers $118_2$ and $118_N$ are shown as delivering complement weighted signals.

Figure 6:
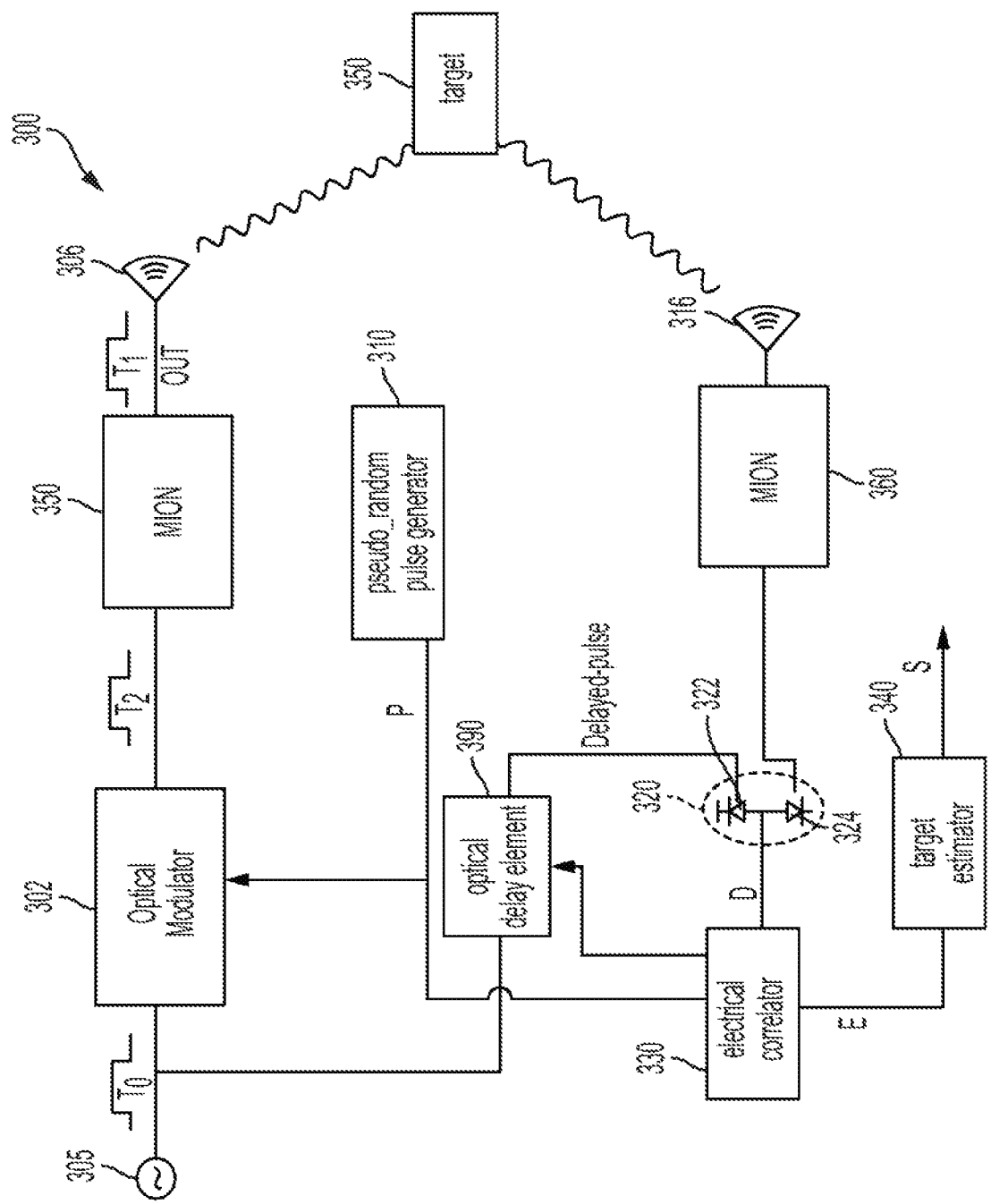
FIG. 6 is a simplified high-level block diagram of a sensing system, in accordance with one exemplary embodiment of the present invention.

FIG. 6 is a high-level simplified schematic block diagram of a ranging system 300, in accordance with one embodiment of the present invention. Optical source 305 generates a stream of carrier optical pulses each having a pulse width $T_0$ that may be, for example, 1-5 femtoseconds long. Optical modulator 302 is adapted to modulate the carrier optical pulses 305 using the pulses generated by the pseudo-random pulse generator 310. In response, optical modulator 302—which may be a Mach-Zehnder optical modulator—generates a stream of optical pulses that have a pulse-width of $T_2$. In one example, pulses $T_2$ may be 10 picoseconds long.

Optical pulse $T_2$ is optically modulated by MION 350 using a time period $T_1$ which may be, for example, 100 femtoseconds long, as described above with reference to MIONs 50, 100 and 150. The optically modulated output signal OUT of MION 350 is transmitted using optical radiator 306 which may be, for example, a grating coupler. The optical signal transmitted by radiator 306 is reflected off target 350 whose distance from ranging system 300 is being measured. The reflected optical signal is received by optical receiver 316 and demodulated by MION 360

The demodulated optical output of MION 360 is then combined with the delayed replica of carrier optical pulse by optical detector 320, which in response, generates a down-converted beat-tone signal D. Optical delay element 390 receives and delays the optical signal generated by source 305—in response to the signal generated by correlator 330—to generate optical signal Delayed Pulse applied to optical detector 320. Optical detector 320 is shown as including a pair of balanced photodiodes 324 and 322, respectively receiving the optical signal supplied MION 360 and signal Delayed-Pulse. Correlator 330 is adapted to correlate the output signal D of the optical detector 320 with the output signal P of the pseudo random generator 310 to provide a correlated signal E representative of the measure of the distance between sensing system 300 and target object 350. The output signal E of correlator 330 is further processed by target estimator 340, which is an electrical signal processing unit, to provide the distance S between target 350 and ranging system 300.

Figure 7A:
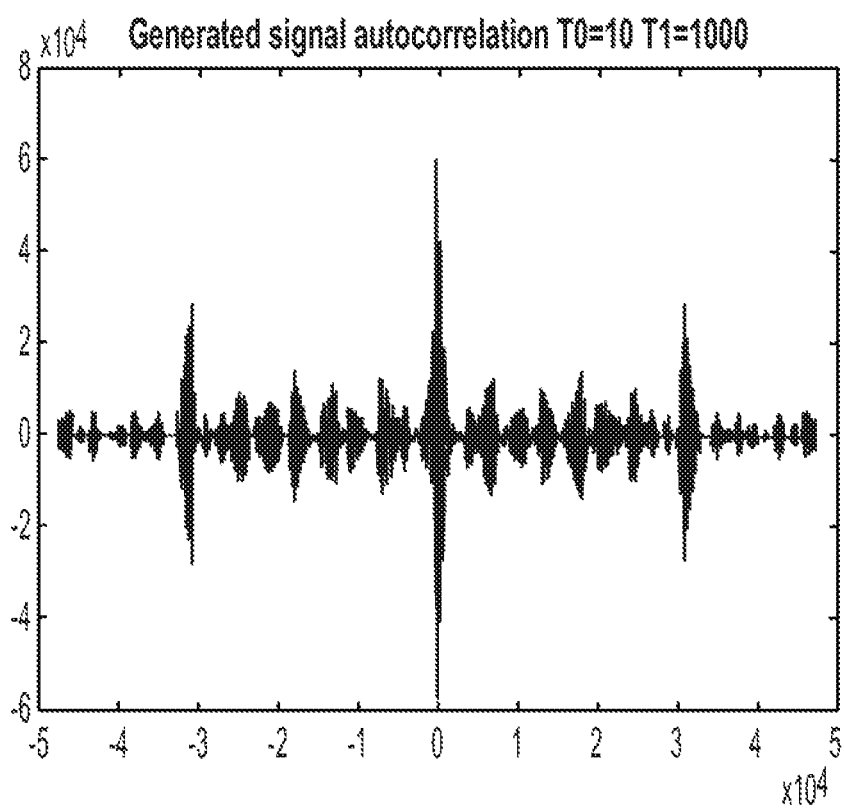
FIGS. 7A, 7B, 7C and 7D are computer simulations of the signals generated along the receive path of the sensing system of the present invention in accordance with a first example.
Figure 7B:
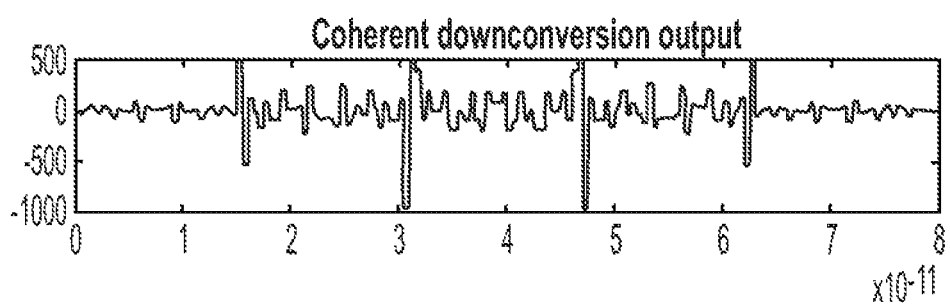
Figure 7C:
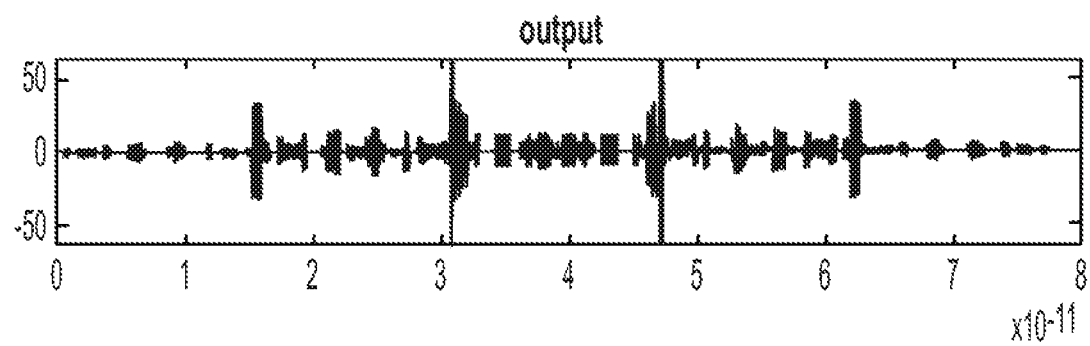

FIG. 7A is a computer simulation of the signal supplied by the receive MION 360 of FIG. 6, in accordance with one example. To generate the data shown in FIG. 7A, the optical signal generated by optical modulator 302 was selected to have a relatively fast rise time (e.g., near zero) and the delay $T_1$ was selected to be a multiple of the width of the pulse of the carrier signal supplied by source 305. FIG. 7B shows output signal D of photo detector 320, and FIG. 7C shows the output signal E of correlator 330 generated in response to the signal shown in FIG. 7A.

Figure 7D:
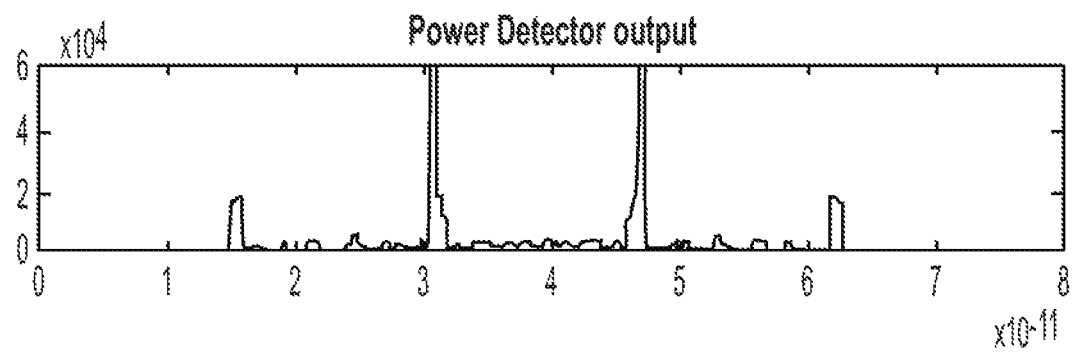

As is seen, a high degree of correlation exists between the carrier pulse and the strong peaks corresponding to the distance being measured. In other words, the relative time positions of the strong correlated peaks in FIG. 7C correspond to the distance between the ranging system and the object reflecting the signals received by revive MION 360. FIG. 7D shows the output of another photo detector that directly down converts the signal received from MION 360 using a photodiode and without using the reference optical signal generated by source 305.

Figure 8A:
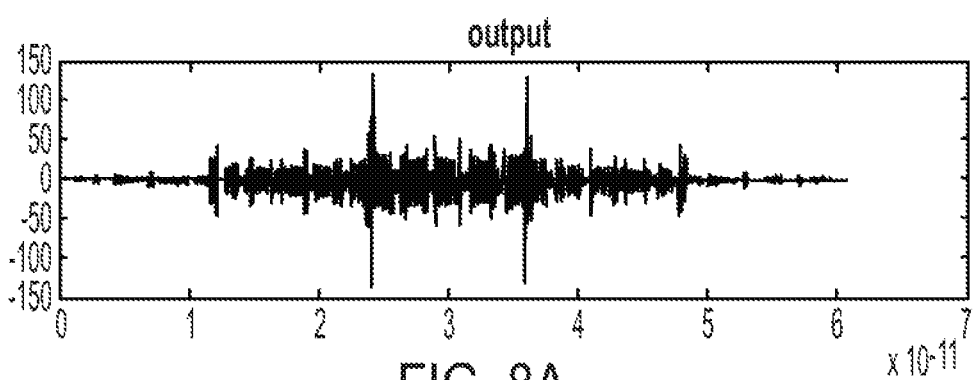
FIGS. 8A, 8B, 8C and 8D are computer simulations of the signals generated along the receive path of the sensing system of the present invention in accordance with a second example.
Figure 8B:
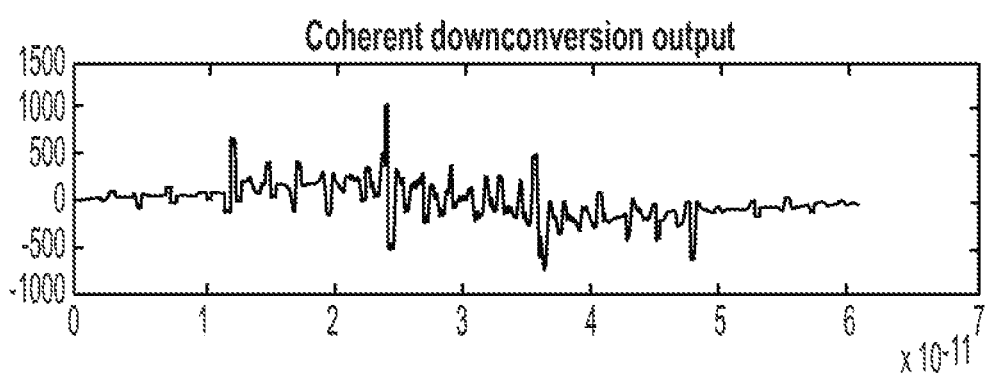
Figure 8C:
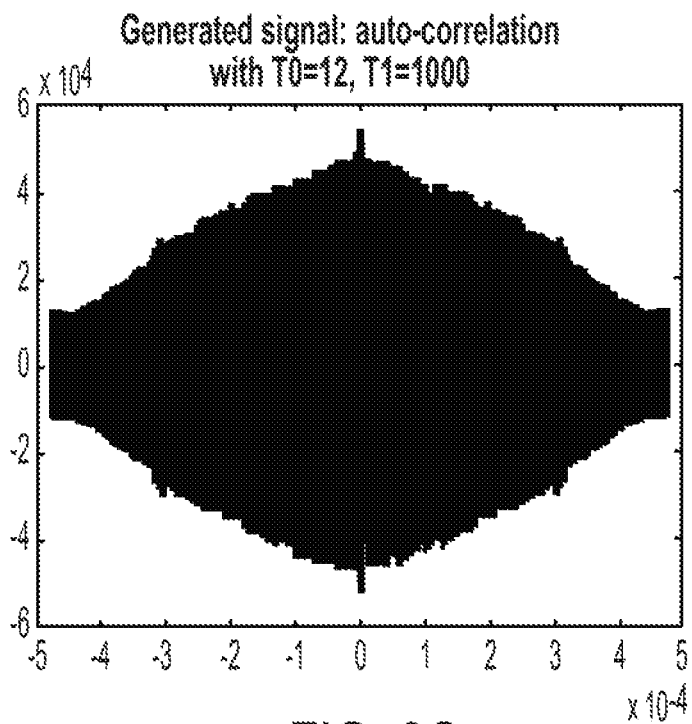
Figure 8D:
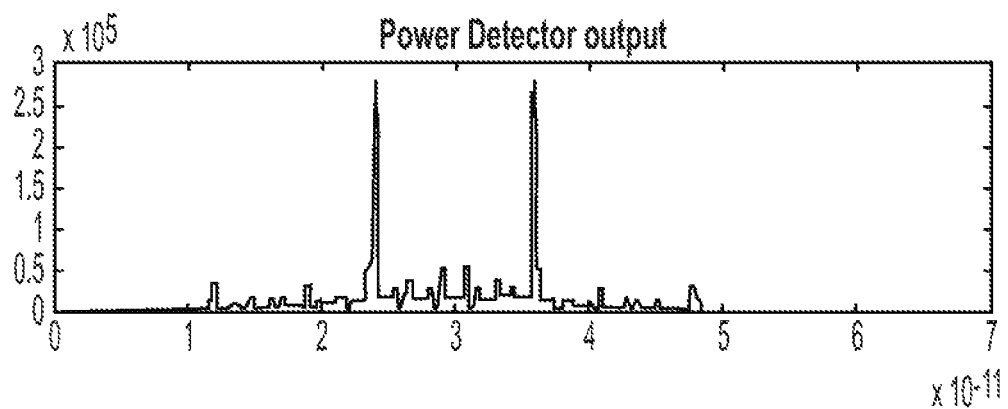

FIG. 8A is a computer simulation of the signal supplied by receive MION 360 of FIG. 6, in accordance with another example. To generate FIG. 8A, the optical signal generated by optical modulator 302 was selected to have a relatively fast rise time, and the delay $T_1$ was selected so as not to be a multiple of the width of the pulse of the carrier signal supplied by source 305. FIG. 8B shows output signal D of photo detector 320, and FIG. 8C shows the output signal E of the correlator 330. FIG. 8D shows the output of another photo detector that directly down converts the signal received from MION 360 using a photodiode and without using the reference optical signal supplied by source 305.

In some embodiments of the present invention, the optical signal modulator that modulates the carrier optical pulse (such as optical signal modulator 302 shown in FIG. 6) may be a Mach-Zehnder modulator. A Mach-Zehnder modulator may be integrated on the same substrate in which a MION is formed. Such an integration enables pulse $T_2$ to be generated on the same silicon-photonics substrate that includes the MION.

Figure 9A:
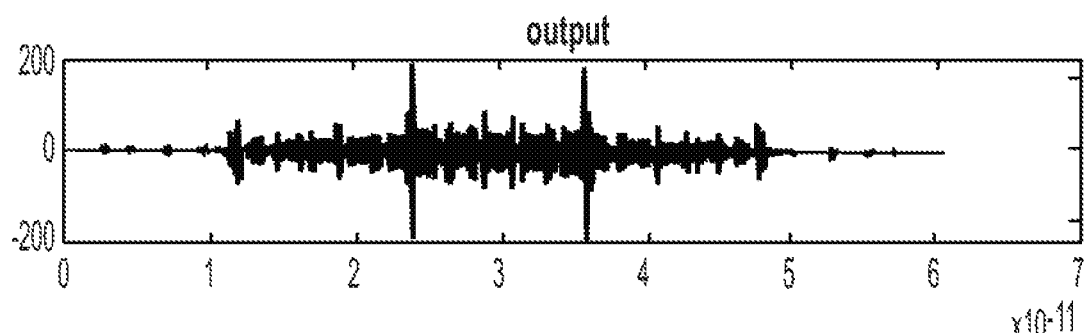
FIGS. 9A, 9B and 9C are computer simulations of the signals generated along the receive path of the sensing system of the present invention in accordance with a third example.
Figure 9B:
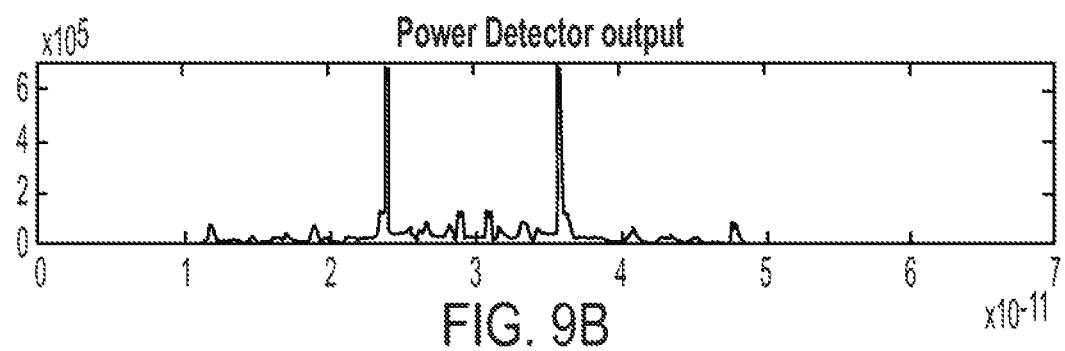
Figure 9C:
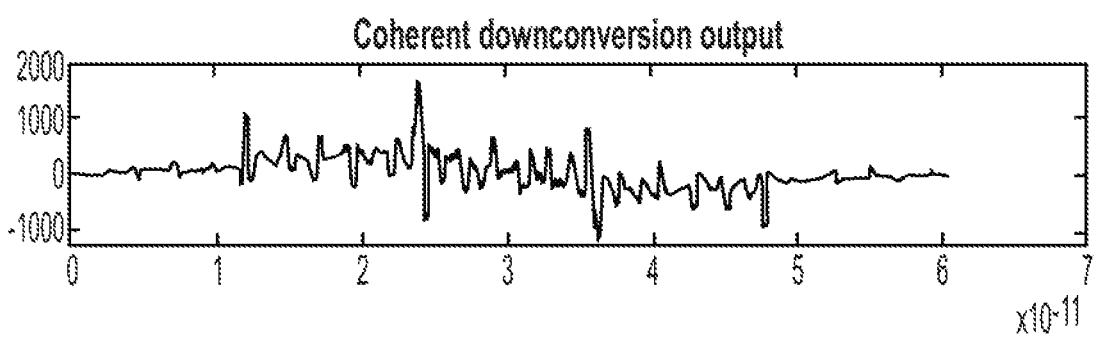
Figure 10A:
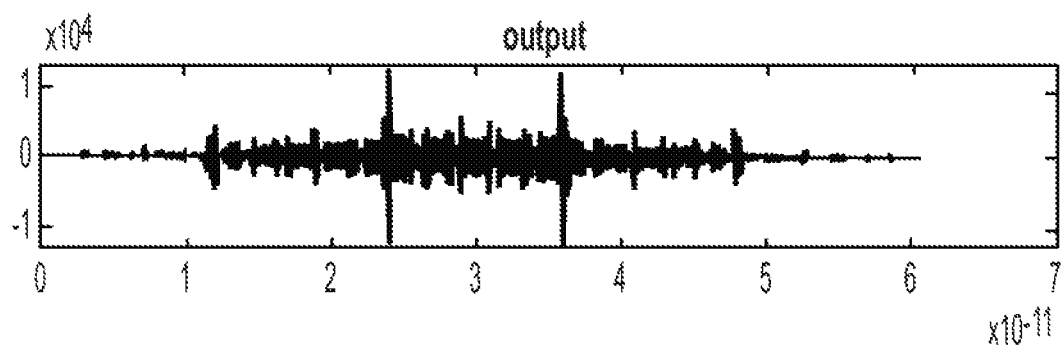
FIGS. 10A, 10B and 10C are computer simulations of the signals generated along the receive path of the sensing system of the present invention in accordance with a fourth example.
Figure 10B:
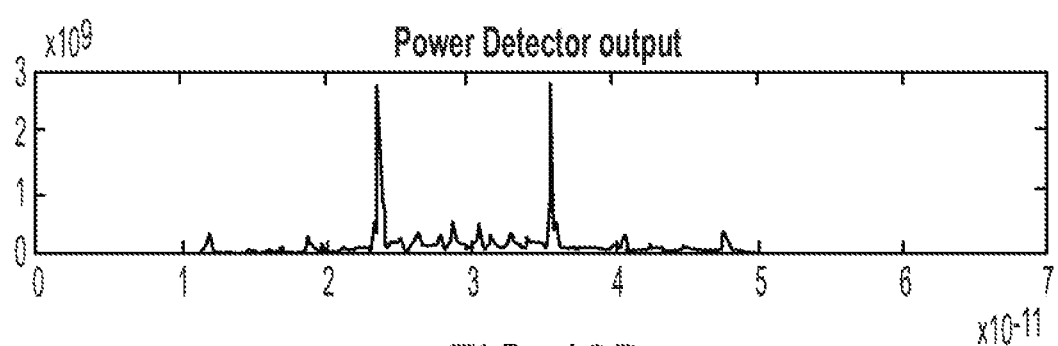
Figure 10C:
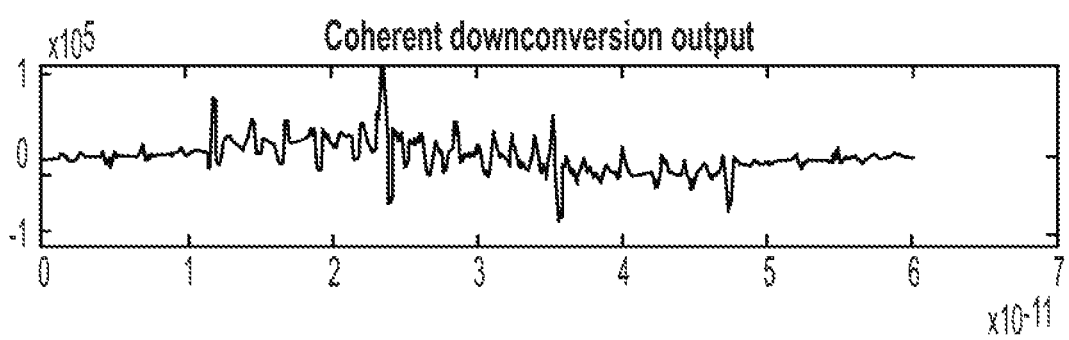
Figure 11A:
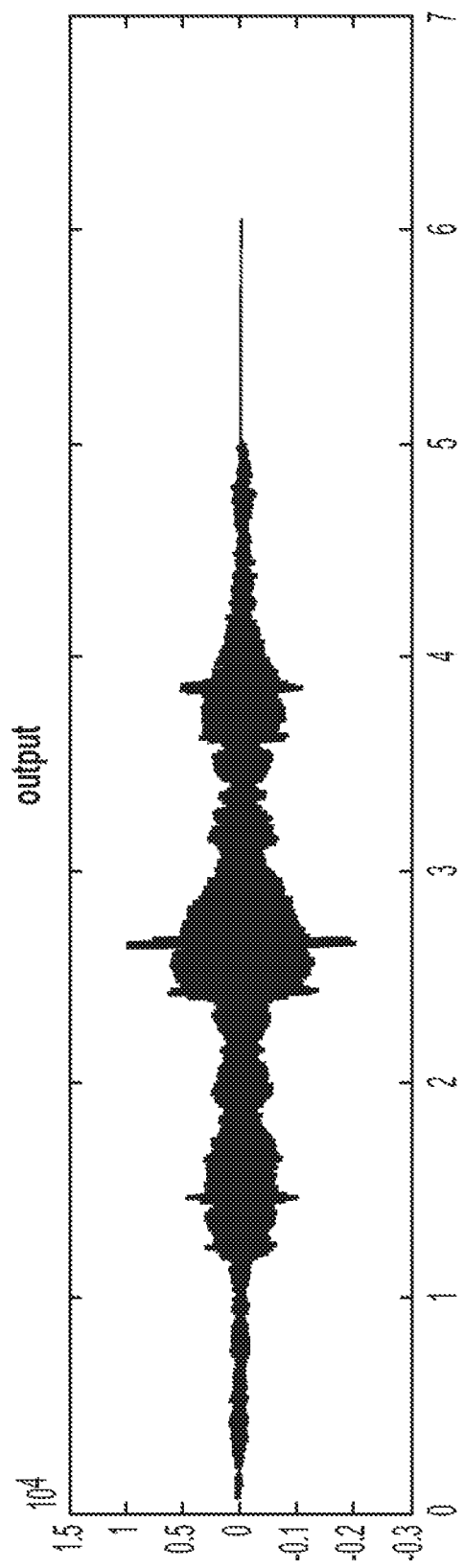
FIGS. 11A, 11B and 11C are computer simulations of the signals generated along the receive path of the sensing system of the present invention in accordance with a fourth example.
Figure 11B:
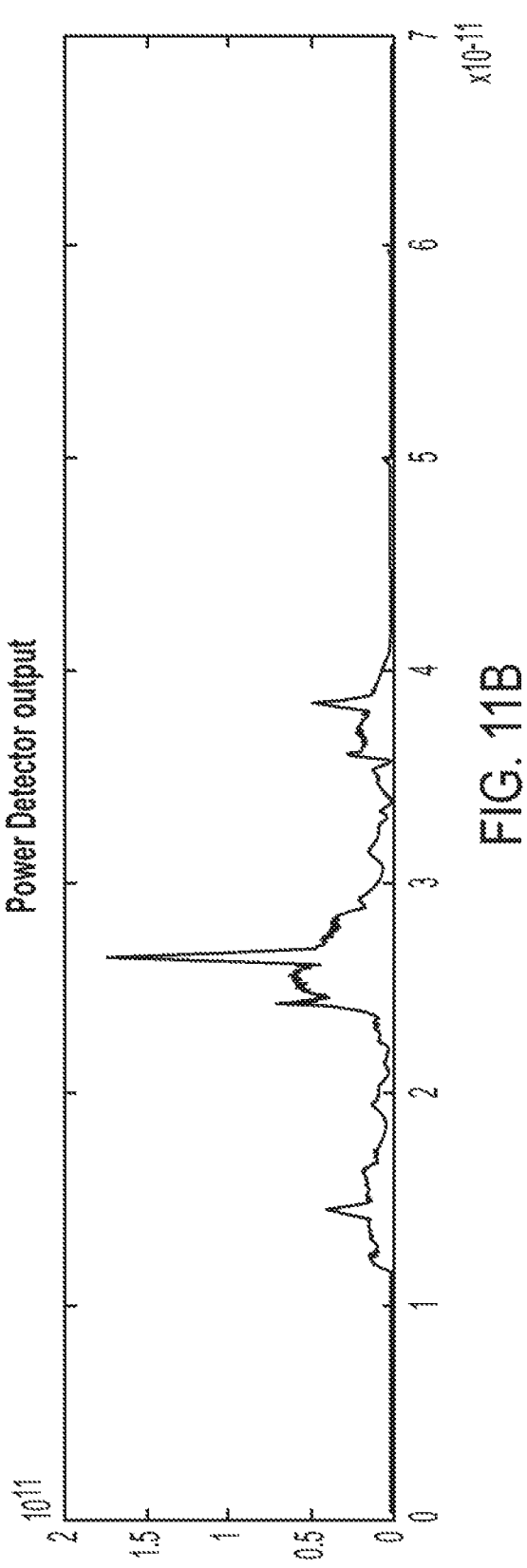
Figure 11C:
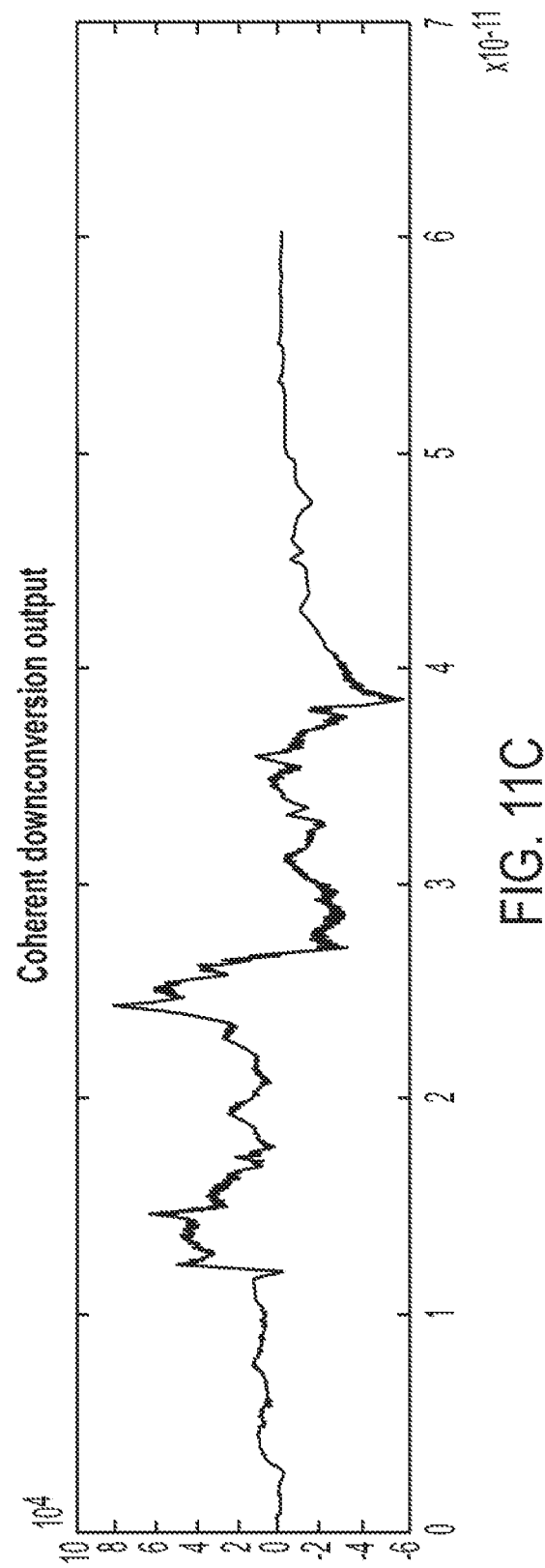

FIGS. 9A, 10A and 11A are computer simulations of the signals supplied by a receive MION (for example, MION 360 of FIG. 6) when the pulses $T_2$ are selected to have respective risetimes of 0, $100T_0$, and $500T_0$, where $T_0$ is the width of the carrier optical pulse. FIGS. 9B, 10B and 11B show the output signals of a photo-detector receiving the signals shown in FIGS. 9A, 10A and 11A respectively. FIGS. 9C, 10C and 11C show the output signals of the correlator for the signals shown in FIGS. 9B, 10B and 11B, respectively.

Figure 12:
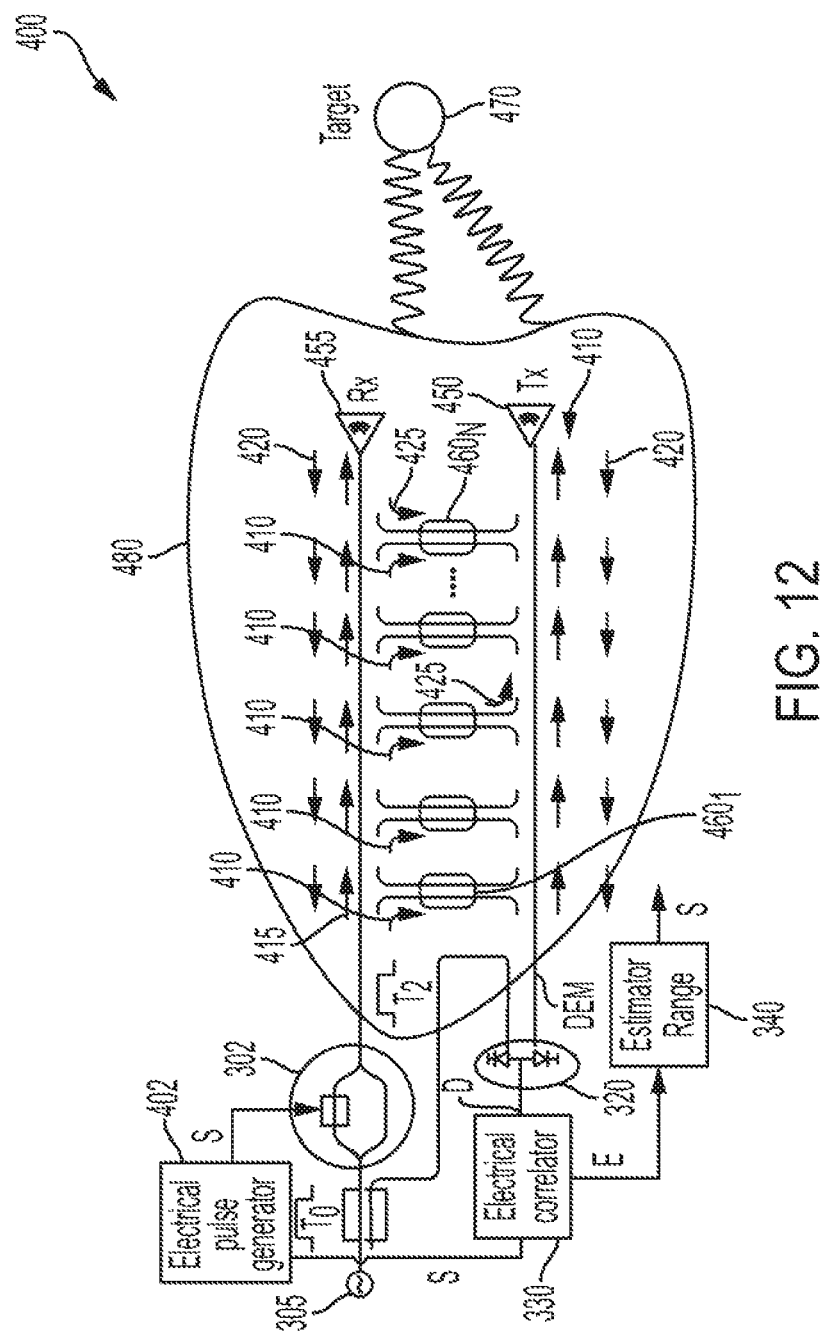
FIG. 12 is a simplified high-level block diagram of a sensing system, in accordance with one exemplary embodiment of the present invention.

FIG. 12 is a high-level simplified schematic block diagram of a ranging system 400, in accordance with another embodiment of the present invention. Ranging system 400 includes a bi-directional MION 480 that performs optical modulation and demodulation through the same optical paths, as well as optical modules that apply the weight coefficients. Because the bi-directional MION uses the same optical paths as well as the same optical modules applying the weight coefficients, any size mismatches that may exist between different optical components of the MION and formed during its fabrication causes the same deviations during both transmission and reception of the signals. Therefore, the bi-directional MION provides a much more precise reproduction of the weight coefficients and delays used to generate and recover the modulated pulses.

The carrier optical signal generated by source 305 is modulated by Mach-Zehnder modulator 302 in response to the electrical control signal S. The optical output of Mach-Zehnder modulator 302, which has a pulse-width of $T_2$, is caused to propagate (along directions 410, and 415) through the waveguide and optical modules $460_1$ ... $460_N$ which respectively apply weights $w_1 \ldots w_N$ to the optical signal they receive. The weighted signals are combined by an optical combiner (not shown for simplicity) and transmitted through optical transmitter 450.

The optical signal transmitted by transmitted 450 is shown as being reflected off target 750 and received by optical receiver 455. The received optical signal is shown as propagating along directions 420 and 425 and through the waveguide and optical modules $460_1 \ldots 460_N$. Optical modules $460_1 \ldots 460_N$ respectively apply weights $w_1 \ldots w_N$ to the optical signal they receive to generate a demodulated optical signal DEM. Photo-detector 320 is adapted to detect and down-convert signal DEM to generate electrical signal D. Correlator 330 receives the output of photo-detector 320, and in response, generates a correlation signal E representative of a measure of the distance between ranging system 400 and target 470. Target estimator 340 provides a measure S of the distance using the correlated signals supplied by correlator 330.

The above embodiments of the present invention are illustrative and not limitative. The above embodiments of the present invention are not limited by the type of waveguide, optical modules such as optical couplers, combiners and the like, pulse-widths, delays, modulation algorithm, or the substrate used in a MION. The above embodiments of the present invention are not limited by the number of optical radiators or receivers. For example, although the above embodiments of the present invention are described with reference to a single radiator radiating the modulated optical signal, it is understood that embodiments of the present invention may have multiple radiators thereby enabling the radiated signals to combine in free space. Other additions, subtractions or modifications are obvious in view of the present disclosure and are intended to fall within the scope of the appended claims.

What is claimed is:

1. A photonics sensing system comprising:
    a first multipath integrated optical network comprising:
        N optical delay elements each supplying a different one of N delayed optical signals of a received optical pulse;
        N optical modules each supplying a portion of a different one of the N delayed optical signals; and
        an optical combiner adapted to combine the N delayed portions to generate a modulated optical signal, wherein a delay supplied by a first one of the N optical delay elements is shorter than a width of the received optical pulse;
    an optical radiator configured to transmit the modulated optical signal;
    an optical receiver configured to receive a reflection of the transmitted signal; and
    a second multipath integrated optical network adapted to demodulate the reflected signal received by the optical receiver.

2. The photonics sensing system of claim 1 further comprising:
    a down-converter adapted to down-convert a frequency of the demodulated signal to generate an electrical signal.

3. The photonics sensing system of claim 2 further comprising:
    a correlator adapted to correlate the down-converted electrical signal to a pseudo-random electrical signal so as to generate a correlation signal.

4. The photonics sensing system of claim 2 wherein said down-converter includes a pair of photo-diodes.

5. The photonics sensing system of claim 3 wherein the pseudo-random electrical signal is applied to an electrical modulator to generate the optical pulse from an optical source.

6. The photonics sensing system of claim 3 further comprising:
    a processor adapted to determine a position of the object from the correlated signal.

7. The photonics sensing system of claim 1 wherein the N optical delay elements and the N optical modules are common to the first and second multipath integrated optical networks.

8. The photonics sensing system of claim 1 wherein said photonics sensing system is integrated on a photonics substrate.

9. The photonics sensing system of claim 1 wherein said N optical modules comprise N optical couplers, wherein each of said portions is controlled by tapping a different part of the optical coupler.

10. The photonics sensing system of claim 9 wherein said N optical modules further comprise N directional couplers each associated with a different one of the N optical couplers, each directional coupler adapted to control an amplitude and/or a phase of the optical signal received from the associated optical coupler and deliver the amplitude and/or phase controlled optical signal to the optical combiner.

11. A multipath integrated optical network comprising:
    N optical delay elements each supplying a different one of N delayed optical signals of a received optical pulse;
    N optical modules each receiving a portion of a different one of the N delayed optical signals and supplying a weighted delayed signal;
    an optical combiner adapted to combine the N weighted delayed signals to generate a modulated optical signal, wherein a delay supplied by a first one of the N optical delay elements is shorter than a width of the received optical pulse.

12. The multipath integrated optical network of claim 11 wherein each of the N optical delay elements generates substantially a same amount of delay.

13. The multipath integrated optical network of claim 12 wherein each of the N optical delay elements is generated by an equal length of a same waveguide.

14. The multipath integrated optical network of claim 13 wherein each of a subset of the N optical modules supplies a phase inverted weighted delayed signal to the optical combiner.

15. The multipath integrated optical network of claim 11 wherein the N optical modules comprise N optical couplers.

16. The multipath integrated optical network of claim 15 wherein the N optical modules further comprise N optical directional couplers each associated with a different one of the N optical couplers.

17. The multipath integrated optical network of claim 16 wherein each of the N directional couplers is adapted to control an amplitude and/or phase of the optical signal received by the directional coupler.

18. The multipath integrated optical network of claim 17 wherein the multipath integrated optical network is formed on a substrate.

19. A multipath integrated optical network comprising:
    an optical signal splitter adapted to split an incoming optical pulse into at least N optical pulses, wherein N is an integer greater than one;
    N optical delay elements each adapted to receive a different one of the N split optical signals and delay the received optical signal by a different amount of delay;

an optical combiner adapted to combine different weights of the N delayed optical signals to generate a modulated optical signal, wherein said weights are determined in accordance with a modulation scheme in conformity with which the optical signal is modulated.

20. The multipath integrated optical network of claim 19 wherein a delay by $i^{th}$ delay element is i times the shortest delay.

21. The multipath integrated optical network of claim 19 wherein each of the N optical delay elements is a portion of a waveguide.

22. The multipath integrated optical network of claim 19 further comprising:
N directional couplers receiving the N delayed optical signals and generating the N weighted delayed signals combined by the combiner.

23. A multipath integrated optical network comprising:
an optical waveguide;
N optical couplers each adapted to receive a different fraction of an optical pulse propagating through the waveguide;
N directional couplers each adapted to apply a different weight to a different one of the N optical signals supplied by the N optical couplers to generate a weighed optical signal; and
an optical combiner adapted to combine the N weighted signals to generate a modulated optical signal, wherein a delay associated with a first fraction of the optical signal propagating through the waveguide is shorter than a width of the optical pulse.

24. The multipath integrated optical network of claim 20 wherein the N optical delay elements are portions of a waveguide.

25. A method of photonics sensing comprising:
generating N delayed signals of an optical pulse;
applying N coefficients to the N delayed signals to generate N weighted delayed signals;
combining the N weighted delayed signals to generate a modulated optical signal, wherein a smallest of the N delays is smaller than a width of the optical pulse;
radiating the modulated optical signal;
receiving a reflection of the radiated signal; and
demodulating the reflected signal.

26. The method of claim 25 further comprising:
down-converting a frequency of the demodulated signal to generate an electrical signal.

27. The method of claim 26 further comprising:
correlating the down-converted electrical signal to a pseudo-random electrical signal so as to generate a correlation signal.

28. The method of claim 26 further comprising:
down-converting the frequency of the demodulated signal using a pair of photo-diodes.

29. The method of claim 27 further comprising:
applying the pseudo-random electrical signal to an electrical modulator to generate the optical pulse from an optical source.

30. The method of claim 27 further comprising:
determining a position of an object causing the reflection from the correlation signal.

31. The method of claim 25 further comprising:
demodulating the reflected signal via optical delay elements and optical modules used to generate the modulated optical signal.

32. The method of claim 25 wherein the generating, applying, combining, radiating and receiving are performed using optical delay elements and modules formed in a photonic substrate.

33. The method of claim 25 wherein the coefficients are applied by optical modules comprising optical couplers different parts of which are tapped to generate the delayed signals.

34. The method of claim 33 wherein said N optical modules further comprise N directional couplers each associated with a different one of the N optical couplers, each directional coupler adapted to control an amplitude and/or a phase of the optical signal received from the associated optical coupler and deliver the amplitude and/or phase controlled optical signal to an optical combiner combining the weighted delayed signals.

35. A method of modulating an optical pulse, the method comprising:
generating a plurality of delayed signals of the optical pulse;
applying a plurality of coefficients to the plurality of delayed signals to generate a plurality of weighted delayed signals; and
combining the plurality of weighted delayed signals to generate the modulated optical signal, wherein a smallest of the plurality of delays is smaller than a width of the optical pulse.

36. The method of claim 35 wherein the time period between each pair of successive delays is defined by a same value.

37. The method of claim 35 wherein each of the delayed signals is generated by an equal length of a same waveguide.

38. The method of claim 35 further comprising inverting a phase of each of a subset of the delayed signals.

39. The method of claim 35 wherein the plurality of coefficient are applied by a plurality of optical modules comprising a plurality of optical couplers.

40. The method of claim 39 wherein the plurality of optical modules further comprise a plurality of optical directional couplers each associated with a different one of the plurality of optical couplers.

41. The method of claim 40 wherein each of the directional couplers is adapted to control an amplitude and/or phase of the optical signal received by the directional coupler.

42. The method of claim 35 wherein the generating, applying and combining are performed using optical delay elements and modules formed in a photonic substrate.

43. A method of modulating an optical pulse, the method comprising:
splitting a received optical pulse into N split signals, wherein N is an integer greater than one;
delaying each of the N split signals by a different amount of delay to generate N different delayed signals;
combining N weighted delayed signals to generate the modulated optical signal, wherein a smallest of the N delays is smaller than a width of the optical signal.

44. The method of claim 43 wherein an ith delay is i times the smallest delay, wherein i is an integer varying from 1 to N.

45. The method of claim 43 wherein the optical pulse propagates through an optical waveguide different lengths of which generate the N delays.

46. The method of claim 44 further comprising:
applying N weights to the plurality of delayed signals via N directional couplers to generate the N weighted delayed signals.

47. A method of modulating an optical pulse comprising:
receiving N different fractions of an optical pulse;
applying different weights to the N different fractions of the optical signal to generate N weighed signals; and
combining the N weighted signals to generate a modulated optical signal, wherein a delay associated with a first fraction of the optical signal is shorter than a width of the optical pulse.

48. The method of claim 47 wherein the N different fractions are received from a waveguide through which the optical pulse propagates.

* * * * *